United States Patent [19]

Fischer

[11] 3,911,738

[45] Oct. 14, 1975

[54] LINEARIZED FORCE MEASURING APPARATUS

[76] Inventor: Hans Werner Fischer, Am Moenchsrain 25, D-692 Sinsheim, Germany

[22] Filed: May 17, 1974

[21] Appl. No.: 471,030

[30] Foreign Application Priority Data

May 23, 1973  Germany............................ 2326233

[52] U.S. Cl. .............................. 73/141 R; 73/517 B
[51] Int. Cl.² .......................................... G01L 5/00
[58] Field of Search ....... 73/141 R, 517 B; 177/213, 177/214; 318/646

[56] References Cited
UNITED STATES PATENTS

| | | | |
|---|---|---|---|
| 3,096,657 | 7/1963 | Cohen ............................... | 73/517 B |
| 3,151,486 | 10/1964 | Plummer ........................... | 73/517 B |
| 3,192,371 | 6/1965 | Brahm ............................... | 73/517 B X |
| 3,226,979 | 1/1966 | De Boice ........................... | 73/517 B |

*Primary Examiner*—James J. Gill
*Attorney, Agent, or Firm*—Hans Berman

[57] ABSTRACT

The force to be measured and a pulsed voltage creating a balanced electrostatic force in opposition thereto are applied to a two- or three-plate capacitor. Displacement of one capacitor plate relative to another is measured and resultant measurement signal converted by an amplitude/pulse converter to pulses having a repetition frequency varying as a function of amplitude of displacement signal. In one embodiment the amplitude/pulse converter furnishes a first and second pulse sequence having, respectively, a number of pulses during a measurement interval increased and decreased in proportion to the amplitude of measurement signal. The force to be measured is applied to central plate, while the first and second pulse sequence are applied to first and second outer plates of a three-plate capacitor in this embodiment. For a two-plate capacitor, an additional amplifier for amplifying the measurement signal and having an amplification factor porportional to the amplitude of the pulses divided by the distance between the capacitor plates furnishes an auxiliary voltage which is applied to a capacitor plate in synchronism with a main pulse sequence to linearize the system.

9 Claims, 10 Drawing Figures

LINEARIZED FORCE MEASURING APPARATUS

BACKGROUND OF THE INVENTION

The present invention relates to force-measuring systems, and particularly, to force-measuring systems wherein an electrostatic force is used as a balancing force and wherein the resultant system is linearized so that a particular characteristic of the electrical signal creating the electrical balancing force serves as a linear indication of said force and thereby of the force being measured.

Figure 1:
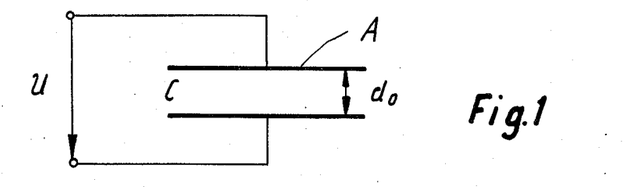
FIG. 1 shows a two-plate capacitor as discussed in the Background of the Invention.

The following theoretical considerations apply to systems of this type utilizing a capacitor. The capacitor used in the systems is a planar capacitor in which a substantial homogeneous electrostatic field is created upon application of a voltage (see FIG. 1). In FIG. 1, a voltage U is applied to a capacitor C having two plates separated by a distance $d_o$, each of the plates having an area A. The force between plates created thereby is $$F = k \cdot \frac{U^2}{d_o^2} \qquad (I)$$

where $k = \frac{1}{2}\epsilon_o \epsilon_r \cdot A$

Here $\epsilon_o$ is the dielectric constant in a vacuum while $\epsilon_r$ is the relative dielectric constant.

Figure 2:
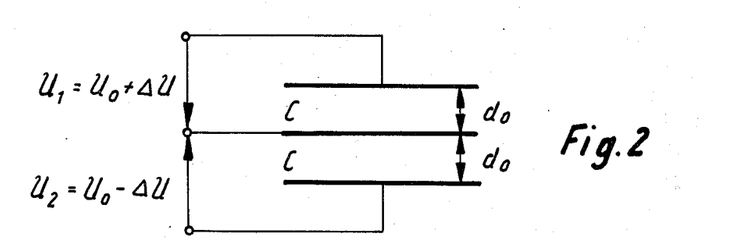
FIG. 2 shows a differential, three-plate capacitor.

The electrostatic force measurement systems today in use generally are analog systems. These may be idiostatic resulting in a non-linear system according to Eq. I or heterostatic resulting in a linear system. To effect a linear system, the use of a differential or three-plate capacitor should now be considered as shown in FIG. 2. A constant voltage $U_o$ is applied to each of the outer plates. To one of these plates an error signal $\Delta U$ is added while the same signal is subtracted from the other plate. This arrangement creates a force which varies linearly as the error voltage:

$$F = k \frac{1}{d_o^2}[(U_o + \Delta U)^2 - (U_o - \Delta U)^2] = \frac{2k}{d_o^2} U_o \cdot \Delta U \qquad (II)$$

The above relationship is valid for both analog and digital circuits. However, the latter have the distinct advantage that the non-linear relationship between force and voltage amplitude can be completely eliminated in that the amplitude of the pulses being used can remain constant, the information being conveyed either in the pulse width (pulse width modulation) or, for constant pulse width, in the number of pulses per unit time, that is, per measurement interval (frequency modulation). The present invention is based on this consideration.

A further non-linearity is created in analog, as well as digital measurement systems when the distance between electrodes, $d_o$, is not constant. This occurs when a proportionally operating compensation circuit is utilized. This type of circuit generates the so-called constant control deviation (proportional offset $x$). When deviation is entered into equation I, the following series results for $x < d_o$:

$$F = k \frac{U^2}{(d_o + x)^2} = k \frac{U^2}{d_o^2}\left(1 - 2\frac{x}{d_o} + 3\frac{x^2}{d_o^2} + \ldots\right) \qquad (III)$$

For a pulsed feed-back with $U = U_o$ and using a two-plate capacitor, the following relationship exists between the force $F$ and the number of pulses $n$ per unit measuring time $T_M$:

$$F = a_o + a_1 \frac{n}{T_M} + a_2 \left(\frac{n}{T_M}\right)^2 + a_3 \left(\frac{n}{T_M}\right)^3 + \ldots \qquad (IV)$$

SUMMARY OF THE INVENTION

It is an object of the present invention to furnish pulsed feed-back circuits wherein the above non-linearities are either decreased by the type of pulse feed-back or are completely eliminated by an additional feed-back path. The present invention is a force-measuring system including a capacitor having a first plate and a second plate mounted parallel to said first plate in a reference position at a predetermined distance therefrom and adapted to move in a direction perpendicular to said first plate under action of the force being measured. It comprises displacement measurement means connected to said capacitor for furnishing a displacement signal having an amplitude varying as a function of the displacement of said second plate from said reference position. The invention further comprises analog/pulse converter means connected to the displacement measurement means and having a converter output, for furnishing a sequence of pulses wherein the number of pulses per unit time corresponds to the amplitude of said displacement. Further, connecting means are provided for connecting said converter output to said capacitor in such a manner that the electrostatic force on said second plate created by said pulses opposes said force being measured, whereby the number of pulses at said converter output created during a measurement interval is a measure of the amplitude of said force being measured.

In a first preferred embodiment of the present invention, the analog/pulse converter means has a first and second converter output and furnishes a first and second pulse sequence at said outputs respectively. A number of pulses per unit time in the first sequence is increased, while that in the second sequence is decreased in proportion to the displacement of the third plate from its initial position. The sequences are applied to the first and second fixed plates of a differential capacitor at whose third, center plate the force being measured is applied.

In a second preferred embodiment, a two-plate capacitor is utilized and an amplifier for amplifying the displacement signal is furnished. The amplification factor of the amplifier is proportional to $U_o$ divided by $d_o$. The displacement signal, after amplification, is applied to the opposite plate of the capacitor in synchronism with the application of the main pulse sequence to one of the plates.

The construction and mode of operation of the circuits of the present invention, together with further objects and advantages thereof, will best be understood by reference to the following description in connection with the accompanying drawings which illustrate preferred embodiments of the present invention.

The preferred embodiments of the present invention will now be described with reference to the drawings.

Some further theoretical considerations will be discussed first with reference to FIG. 2. FIG. 2 shows a differential capacitor wherein each of the outside plates is at a distance $d_o$ from the center plate. Let it now be assumed that pulses are applied to the outer plates such that the number of pulses per measuring interval applied to the top and to the bottom plates is equal when the displacement signal is zero and is increased by a number of pulses corresponding to the amplitude of the displacement signal for the top plate and simultaneously decreased the same amount for the bottom plate in response to a displacement signal. The total number of pulses furnished per measuring interval would thus remain the same, the measuring information being contained in the difference impulses in the two sequences over the measurement interval. Thus:

$$\Delta n = n_+ - n_- \text{ per } T_M \quad \text{(V)}$$

Herein $n_+$ of course refers to the number pulses received in the sequence applied to the top plate, while $n_-$ refers to the number of pulses generated in the second sequence and applied to the bottom plate of the capacitor of FIG. 2.

For this type of differential pulse feedback, the proportional offset $x$ will cause the following relationship to exist:

$$F = a_o + a_1 \frac{\Delta n}{T_M} + a_3 \left(\frac{\Delta n}{T_M}\right)^3 + a_5 \left(\frac{\Delta n}{T_M}\right)^5 + \dots \quad \text{(VI)}$$

In accordance with this equation, it will be noted that all even powered exponents are absent. For feedback circuits with sufficiently tight coupling, the fact that the first even powered exponent $$a_2 = \left(\frac{\Delta n}{T_M}\right)^2$$

is absent, already results in sufficient linearization.

It should be noted that the non-linearity in Eq. III can be completely eliminated by adding an auxiliary voltage, $U_H$, to the constant voltage $U_o$ such that a constant force is maintained:

$$k \frac{(U_o + U_H)^2}{(d_o + x)^2} = k \frac{U_o^2}{d_o^2} \quad \text{(VII)}$$

In accordance with the series of Eq. III, Eqation VII is satisfied for:

$$U_H = U_o \frac{x}{d_o} \quad \text{(VIII)}$$

Thus, the required auxiliary voltage must be proportional to the deviation in the distance between the electrodes ($x$), that is, the offset.

Figure 3:
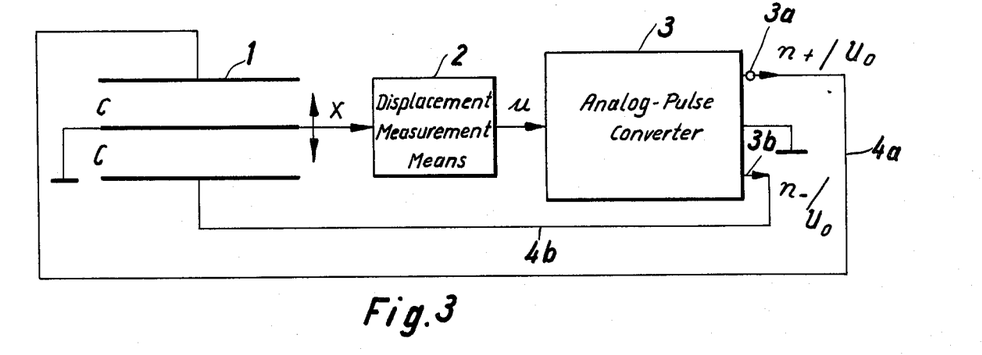
FIG. 3 shows a preferred embodiment of the present invention utilizing a differential capacitor.

The block diagram of the circuit utilizing the type of linearization specified in equations V and VI is shown in FIG. 3. Here is shown a differential capacitor 1 whose center plate is moved a distance $x$ in the direction indicated by arrows. Displacement measurement means 2 furnish a signal $u$ at the output which is proportional to the displacement $x$. The signal $u$ is applied to the input of an analog/pulse converter 3 which has a first converter output labeled 3a and a second converter output labeled 3b. Connecting means, namely a line 4a, connect the first converter output 3a to one plate of the capacitor, while further connecting means, namely a line 4b, connect converter output 3b to the other plate of the capacitor.

Figure 4:
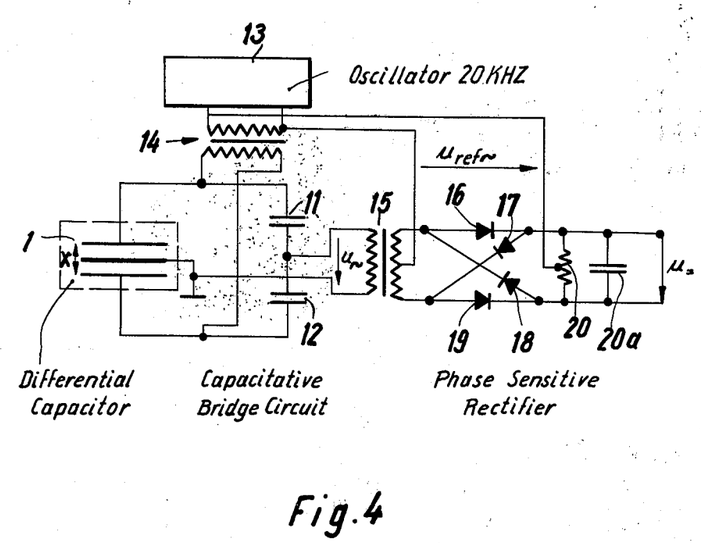
FIG. 4 shows a circuit diagram of the displacement measuring means of FIG. 3.
Figure 5:
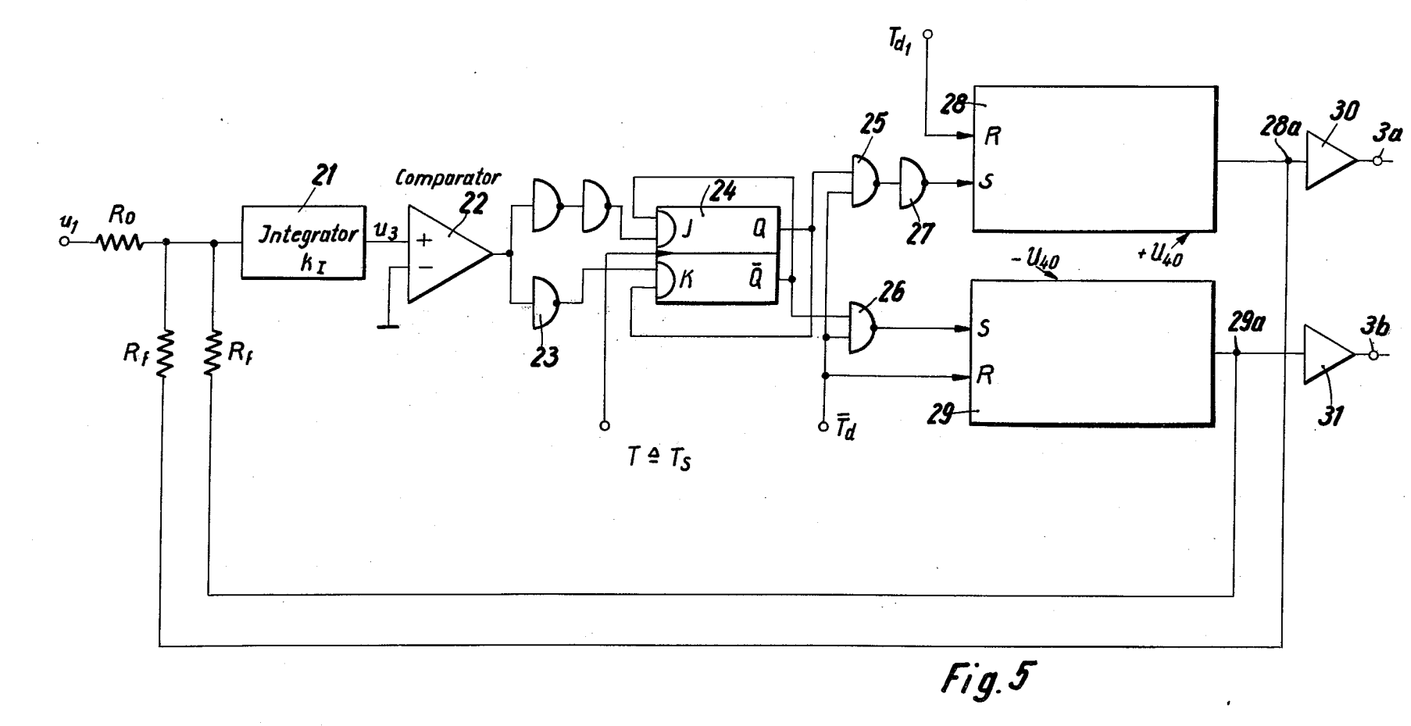
FIG. 5 is a block diagram of the analog/pulse converter of FIG. 3.
Figure 6:
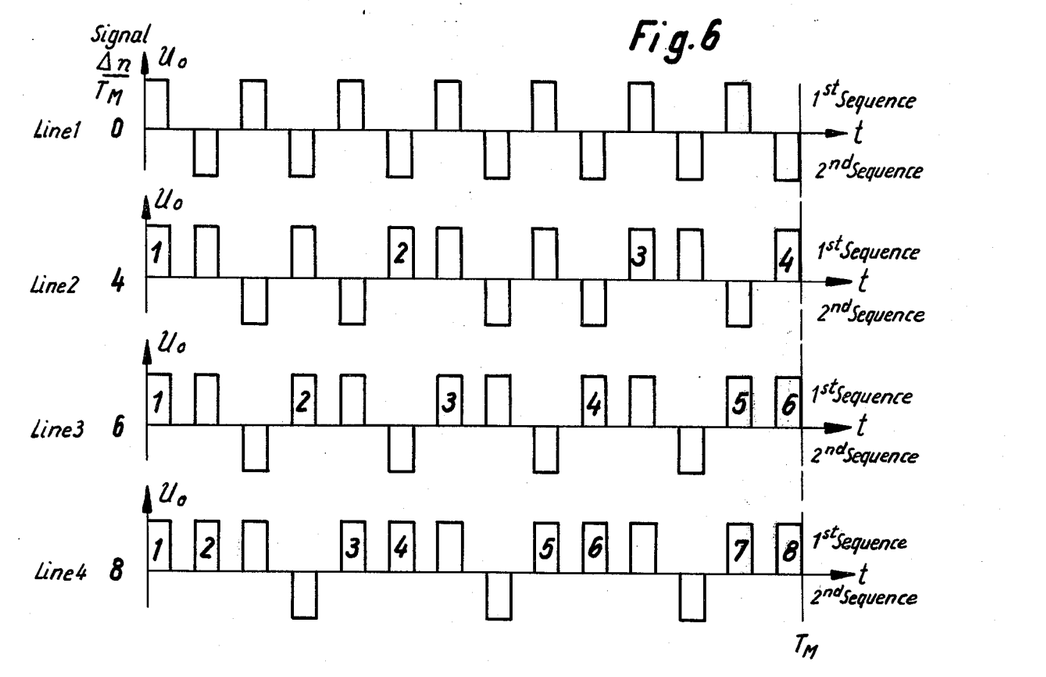
FIG. 6 shows timing diagrams of the pulse sequences at the output of the circuit of FIG. 3.

The operation of the above circuit will become clear with reference to FIGS. 4, 5, and 6. FIG. 4 shows a detailed circuit diagram of the displacement measurement means as connected to the differential capacitor. A displacement measurement means comprise the capacitor 11 and the capacitor 12, which, together with the differential capacitor 1, constitute a capacitor bridge circuit. An oscillator 13 supplies a high-frequency voltage, as for example, a 20 KHz voltage, through a transformer 14 across the differential capacitor 1. Any unbalance in the bridge circuit then appears as a voltage $u$ from the center plate of capacitor 1 to the common point of capacitors 11 and 12. This unbalance voltage is applied to a primary winding of a transformer 15 across whose secondary winding is connected a phase-sensitive rectifier including diodes 16–19. Across the output of the diodes is connected a resistor 20 having a center tap. The secondary winding of transformer 15 also has a center tap, and the output of oscillator 13 is also applied between the abovementioned center taps. Connected in parallel with resistor 20 is a capacitor 20a. The d.c. voltage created across capacitor 20a constitutes the displacement signal. It will be noted that the circuit of FIG. 4 operates in such a manner that any imbalance in the bridge circuit results in the creation of a corresponding d.c. voltage across capacitor 20a, the polarity of the latter-mentioned voltage corresponding to the direction of unbalance of the bridge circuit. It should further be noted, that, in this arrangement, $u = k_s x$, where $k_s$ is the proportionality constant between the amplitude of the d.c. voltage and the amplitude of displacement of the center plate of the capacitor.

The output of the distance measurement means shown in FIG. 4, that is, the voltage across capacitor 20a, then serves as input to the analog/pulse converter circuit shown in FIG. 5. As shown in FIG. 5, the displacement signal $u_1$ is applied to an integrator 21 whose output is applied to the positive input of a comparator 22. The negative input of comparator 22 is connected to ground potential. The output of comparator 22 is connected through an inverter 23 to the K input of a JK flip-flop 24 and through a two-stage inverter (directly) to the J input of this JK flip-flop. Further, the Q output of the JK flip-flop is connected to the K input while the $\bar{Q}$ output is connected to the J input. The clock input of JK flip-flop 24 receives timing signals T at intervals $T_s$. The Q output of flip-flop 24 is connected to one input of a NAND gate 25, whose other input receives delayed inverse timing signals $\bar{T}_d$. The $\bar{Q}$ output of flip-flop 24 is connected to one input of a NAND gate 26 whose other input also receives timing signals $T_d$. NAND gate 25 is connected through an inverter 27 to the set input of a multivibrator 28 whose reset input receives delayed timing signals $T_d$. This bistable multivibrator receives an operating voltage which is positive and indicated by $+U_{40}$. The output of NAND gate 26 is connected to the set input of the second bistable multivibrator 29 which is indicated in the drawing as energized by a negative constant voltage source indicated by $-U_{40}$. The reset input of the bistable multivibrator is connected to receive the delayed inverse timing signal $\bar{T}_d$. The output of multivibrator 28 is labeled 28a and that of multivibrator 29 is labeled 29a. Output 28a is connected to the input of integrator 21 through a resistor $R_f$ and terminal 29a is similar connected. Further, terminal 28a is connected to the input of an amplifier 30 while terminal 29a is connected to the input of an amplifier 31. The output of amplifier 30 is connected to a terminal 3a which corresponds to terminal 3a in FIG. 3, while that of amplifier 31 is connected to a terminal 3b, again in correspondence with FIG. 3.

The above-described analog/pulse converter operates as follows:

The displacement signal $u$ is connected to the input of integrator 21 and the so-integrated signal applied to the positive input of comparator 22. Comparator 22 contains a high gain amplifier and a threshold circuit such that the output of comparator 22 is always either a determined positive value or a determined negative value, depending on the sign of the signal applied at the input. If the signal is positive, the signal will be applied through a two-stage amplifier (here indicated as two inverters connected in cascade and such resulting in no phase shift) to the J input of flip-flop 24. If, prior to the appearance of the next timing signal T, the flip-flop is in the state wherein a $\bar{Q}$ output is generated, then, since all inputs of the J side are high, the flip-flop will switch to the J side, thereby energizing the Q output upon receipt of the next timing signal. If the flip-flop was previously in the state wherein Q output was energized, it cannot, however, flip to the K state since the input from inverter 23 will be missing when the input signal to comparator 22 is positive. Similarly, when the input signal to comparator 22 is negative, the second K input will be energized through inverter 23 allowing the flip-flop to switch to the $\bar{Q}$ output upon receipt of the next timing signal. The Q or $\bar{Q}$ outputs remain energized until receipt of the next timing signal, that is, no change can take place within a time interval $T_s$. Flip-flop 24 is herein referred to as control bistable circuit means, the signal at the Q and $\bar{Q}$ outputs respectively constituting the first and second polarity control signals. Further, the above-mentioned bistable multivibrators 28 and 29, respectively constitute first and second bistable circuit means.

Figure 5A:
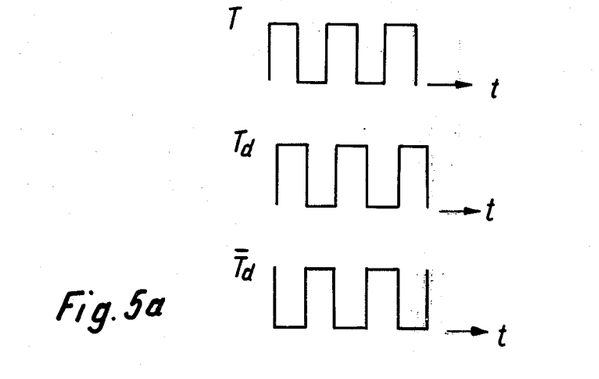
FIG. 5a shows a timing diagram for timing pulses in the analog/pulse converter.

The timing of signals applied to multivibrators 28 and 29 is shown in FIG. 5a. The top line of FIG. 5a shows the timing signals T, the leading edge of each of which transfers the signals at the inputs of JK flip-flop 24 to the respective outputs. Line 2 of FIG. 5a shows the delayed timing signal $T_d$. It should be noted that it is simply delayed a small amount relative to timing signal T but has the same phase. Timing signal $\bar{T}_d$, the inverse delayed timing signal, is in synchronism with timing signal $T_d$, but of opposite phase. It should be particularly noted that the positive going edges of pulse sequence $T_d$ coincide in time with the negative going edges of pulse sequence $\bar{T}_d$. It also will be noted that multivibrators 28 and 29 are reset simultaneously, independent of the output of flip-flop 24, since bistable multivibrator 28 is controlled by positive going pulse edges, while bistable multivibrator 29 is controlled by negative going pulse edges.

Similarly, the setting of one or the other of the multivibrators also takes place at the same time, which of the multivibrators being set being determined by whether a Q or a $\bar{Q}$ output exists at flip-flop 24. When multivibrator 28 is in the set state, a positive output appears at the terminal 28a. When it is in the reset state, terminal 28a returns to a reference potential, which, in a preferred embodiment of the present invention, is ground potential. Similarly, bistable multivibrator 29, when set, furnishes a negative voltage at terminal 29a and, when reset, returns to the same reference voltage as terminal 28a. The resultant pulse sequences at terminals 28a and 29a are shown in FIG. 6. The time $T_M$ shown in FIG. 6 constitutes the measuring interval. The sequence of pulses at terminal 28a has pulses of positive polarity while those at terminal 29a are negative polarity pulses. In line 1, $(\Delta n/T_M)$ is equal to zero, that is, the number of positive pulses is equal to the number of negative pulses, indicating that voltage $u_1$ is substantially zero. In line 2, $(\Delta n/T_M)$ is four, the number of positive pulses exceeding the number of negative pulses by this amount. Further pulse sequences corresponding to larger deviations $x$ are shown in the remaining lines of FIG. 6. The signals at terminals 28a and 29a, of course, are fed back in a negative sense, that is in opposition to the signal $u_1$.

The actual pulses applied to the capacitor are in synchronism with the pulses at terminals 28a and 29a, but may have a different amplitude as required. The positive and negative going pulses which are applied to capacitor 1 (FIG. 3) from terminal 3a and 3b create forces operating in opposing directions in such a manner that the difference serves to oppose the applied force and thus returns the middle plate of the capacitor to the central position. Linearization in accordance with Equation VI is also accomplished. If a more rapid acting circuit is desired, the integrator 21 may be omitted and the integrating effect of the differential capacitor utilized directly in the analog/pulse converter.

Figure 7:
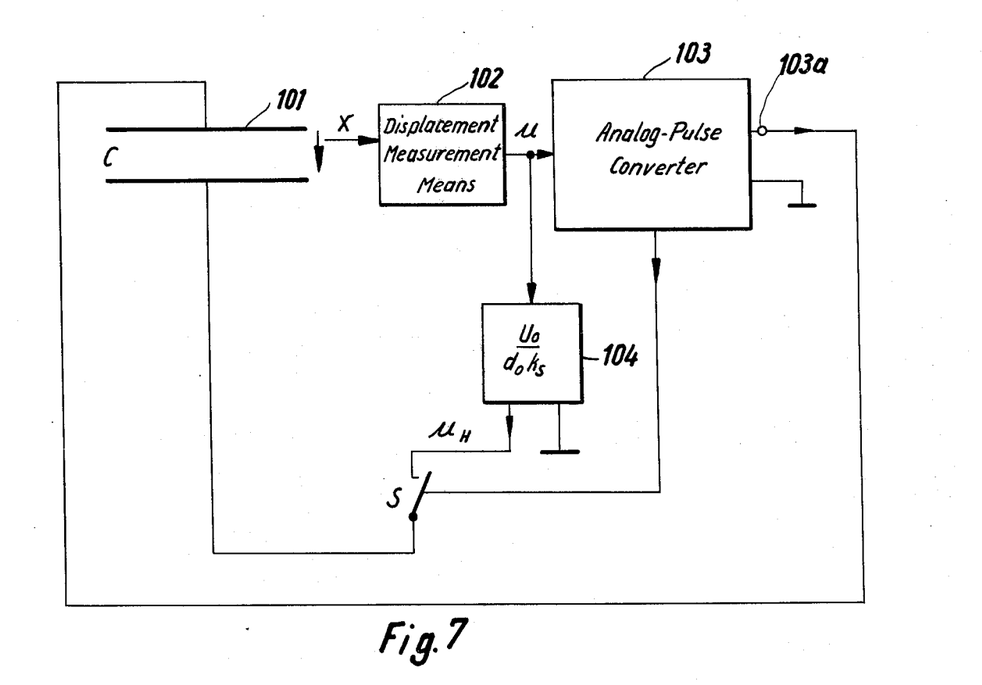
FIG. 7 is an over-all diagram showing a preferred embodiment of the present invention utilizing a two-plate capacitor and an auxiliary feed-back voltage.

An embodiment of the present invention utilizing the auxiliary voltage in accordance with Equation VII above is shown in FIG. 7. Here a two-plate measurement capacitor 101 is utilized, neither of whose plates are grounded. This capacitor again furnishes an input to displacement measurement means 102 which are similar to those shown in FIG. 4, except that a reference capacitor is utilized together with the measurement capacitor in the bridge circuit of the displacement measurement means. The resultant signal $u$ is applied to an analog/pulse converter 103 which is similar to that shown in FIG. 5, except that only one bistable multivibrator is utilized. Further, the voltage $u$ is applied to the input of an amplifier having an amplification factor $$V = \frac{U_o}{d_o k_s}$$

where $k_s = (u/x)$. The output, UH, of the amplifier is applied through a switch S to one plate of capacitor 101. Switch S is an electronic switch which is closed only during the time that a pulse is furnished at a output 103a of analog/pulse converter 103. Switch S is thus operated to close in response to the positive going edge of signal $\overline{T}_d$ (see FIG. 5a).

Figure 8:
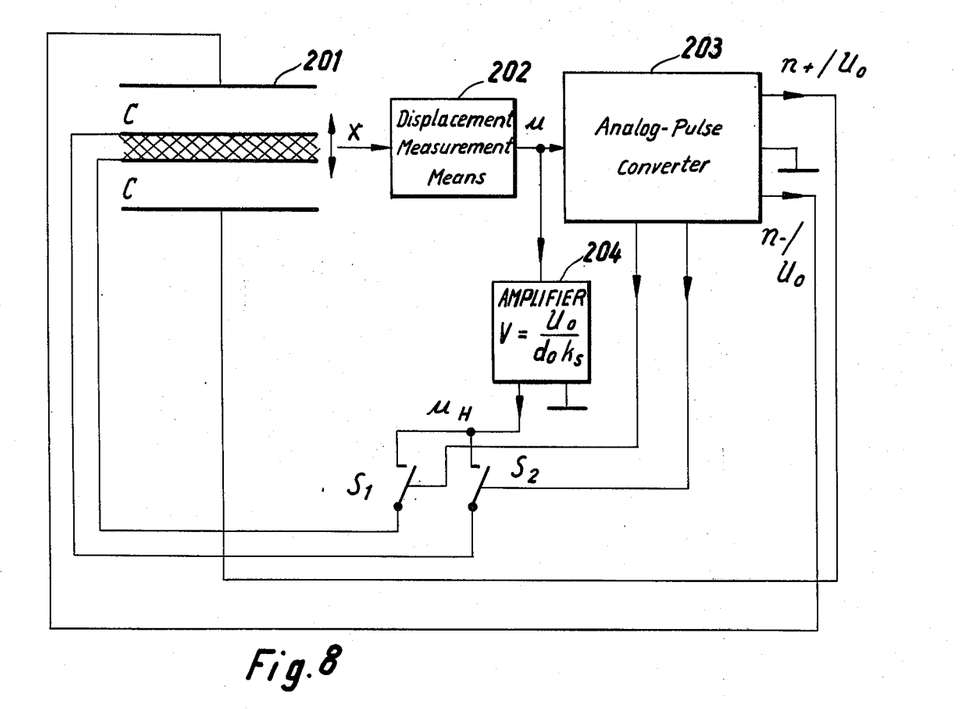
FIG. 8 is a further embodiment of the present invention utilizing a three-plate capacitor and an axuiliary feed-back voltage.

The above method of linearization can also be utilized for three-plate capacitor arrangements which are used when the force to be measured changes its sign. Reference to FIG. 8 shows a three-plate measuring capacitor 201, the displacement of the center plate of which, denoted by $x$, is measured by displacement measurement means 202 at whose output appears a voltage $u = k_s \cdot x$. The voltage $u$ is applied to an analog-pulse converter 203 and further to an amplifier 204 whose gain is equal to the gain of amplifier 104 of FIG. 7. As shown in FIG. 8, capacitor 201 has a center plate which actually consists of a first and second conducting surface separated by insulating material. A switch $S_1$ is shown which when closed connects the output of amplifier 204 to the lower surface of the center plate of capacitor 201. A switch $S_2$ connects the output of amplifier 204 to the upper surface of capacitor 201 when closed. Symbols $S_1$ and $S_2$ stand for electronic switches which, in a preferred embodiment of the present invention, are transistors whose emitter-collector circuit becomes conductive furnishing the necessary connections in response to the proper signal at the base.

The output of analog/pulse converter 203 is applied to the top and bottom plates of capacitor 201.

Two separate modes of operation exist for the circuit of FIG. 8.

In the first, pulses are applied to only one of the outer plates of capacitor 201, depending upon the sign of the applied force. The center plate of capacitor 201 is thus in electrically separate circuits which necessitates the construction of the two conducting surfaces separates by insulating material which is shown in FIG. 8. In this mode of operation, the analog/pulse converter shown in FIG. 9 and discussed in greater detail below is utilized. Also in this mode of operation the non-linearities described in Equation IV exist. These then are again removed by the addition of an auxiliary voltage as shown in FIG. 8. The auxiliary voltage is applied separately through two switches since it will be applied to the top conducting surface of centerplate of capacitor 201 in synchronism with the pulse sequence being applied to the top plate and to the bottom surface of the center plate in synchronism with the pulses being applied to the outer plate.

In the second mode of operation, the analog/pulse converter of FIG. 5 is utilized. This of course in itself causes a partial linearization. If desired, the auxiliary voltage can of course also be used for further improvement of the linearization. However, depending on the displacement direction, the auxiliary voltage must be either added to or subtracted from the constant voltage, that is, the sign of the auxiliary voltage changes. This requires slightly more complicated circuitry for switches $S_1$ and $S_2$ of FIG. 8.

The analog/pulse converter of FIG. 9 will now be described.

Figure 9:
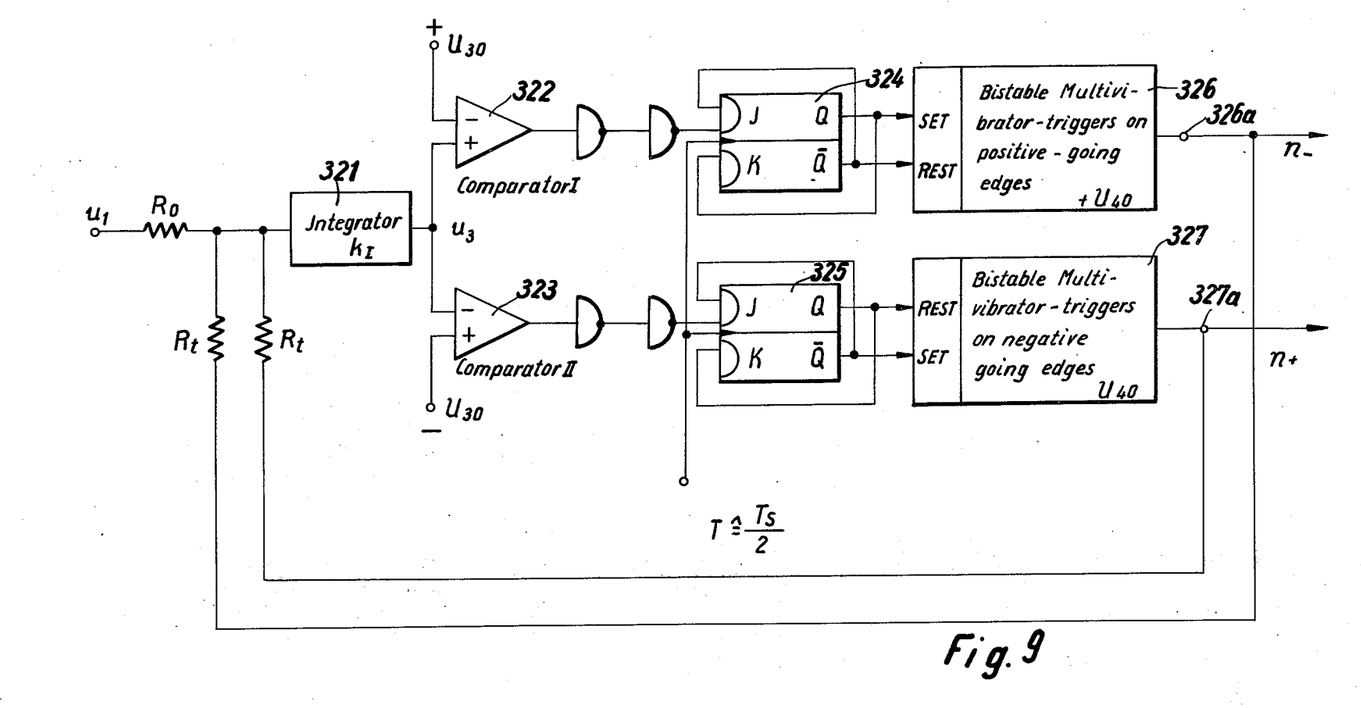
FIG. 9 is a detailed block diagram showing an analog/pulse converter for use in the system shown in FIG. 8.

The input voltage to the circuit of FIG. 9 is the voltage $u_1$. For operation in the first mode, this may have either a positive or a negative polarity. This voltage is applied to an integrator 321 which may be of identical construction with integrator 21 of FIG. 5. Either of these integrators may simply be a series resistor, and a capacitor connected to ground. The output of integrator 321 is applied to the positive input of a comparator 322 and the negative input of a comparator 323. The negative input of comparator 322 is connected to a positive voltage $+U_{30}$, while the positive input of comparator 323 is connected to a negative voltage of $-U_{30}$. The output of comparator 322 is fed through a double inverter (if required for amplification) or else directly to the J input of a JK flip-flop 324. Similarly, the output of comparator 323 is applied to the J input of a flip-flop 325. In both flip-flops, the $\overline{Q}$ output is tied to the J input, and the Q output is tied to the K input. Both flip-flops receive the timing signals T which are furnished at approximately twice the frequency, that is, at one half the time interval, of the timing pulses of FIG. 5. The frequency of the timing pulses of course is determined by the required resolution which is assumed to be the same in both cases. The Q output of flip-flop 324 is tied to the set input while the $\overline{Q}$ output is tied to the reset input of a bistable multivibrator 326 which is fed from a positive constant voltage source $U_{40}$. This multivibrator is designed to trigger on positive going edges as was multivibrator 28 of FIG. 5. Similarly, the $\overline{Q}$ output of flip-flop 325 and the Q output of that flip-flop are tied, respectively, to the set and reset inputs of bistable multivibrator 327 which is energized by a negative constant voltage source $U_{40}$. Bistable multivibrator 327 is triggered by negative going edges of pulses applied to its inputs. The output of bistable multivibrator 326 is connected through a feed-back resistance $R_f$ to the input of integrator 321, as is the output of bistable multivibrator 327.

The above-described circuit operates as follows:

If $u_1$ is positive and the output $u_3$ of integrator 321 is positive and exceeds $U_{30}$, the output of comparator 322 will be positive causing flip-flop 324 to switch from the $\overline{Q}$ to the Q output. Since bistable multivibrator 326 is triggered on positive going edges, this bistable multivibrator will be set. Thus, the positive voltage $+U_{40}$ will be applied to terminal 326a.

For the same positive voltage of amplitude greater than $U_{30}$, comparator 323 will yield a negative output. Flip-flop 325 cannot therefore switch to the set state, wherein a Q output is furnished. No transition thus takes place and bistable multivibrator 327 remains in the reset state.

It is assumed that the amplitude of the pulses fed back through resistor $R_f$ is sufficient to decrease the amplitude of voltage $u_3$ to below the amplitude of voltage $U_{30}$. The voltage of both comparators will be negative under these conditions and bistable multivibrator 326 will reset while bistable multivibrator 327 will remain reset.

For a negative signal $u_1$, as soon as the output of integrater 321 exceeds in amplitude the amplitude of voltage $U_{30}$, comparator 323 will furnish a positive output signal. This will cause flip-flop 325 to change from the $\bar{Q}$ to the Q output. Since bistable multivibrator 327 triggers on negative going edges, the change from a high to a low $\bar{Q}$ output will cause the multivibrator to set, causing a negative voltage to be applied to terminal 327a. This again is applied to the input of integrator 321 to counteract the voltage $u_1$ so that the voltage $u_3$ is again driven towards zero. This circuit thus operates to apply pulses to the upper and lower plates of capacitor 201 in such a manner that only one of these plates receives pulses at any one time. The number of pulses per measuring interval on either of the plates, of course, is an indication of the amplitude of the applied force.

The pulses furnished at output terminals 3a and 3b of FIG. 5 can be applied, in a preferred embodiment of the present invention, to a subtraction circuit such as a forward-reverse counter (not shown) wherein the forward counting input is connected to terminal 3a and the reverse counting input to terminal 3b. The resultant count on the counter then serves as an indication of the magnitude of the applied force. For the analog/pulse converter of FIG. 9, pulses at terminal 326a, in a preferred embodiment of the present invention, would be applied to the input of a first counter (not shown), while those at terminal 327b would be applied to the input of a second counter (not shown). The count on both counters, of course, would have to be stopped at the expiration of the measuring interval. In a preferred embodiment of the present invention, this stopping is accomplished by a third counter which counts the number of timing signals from the start of measurement until a predetermined time interval has elapsed.

Alternatively, of course, analog circuits can be used at the output, the number of pulses received being integrated over a predetermined time interval after which the integration is stopped.

As is seen the circuit of the present invention provides an economical manner for linearizing force measurement arrangements.

While the invention has been illustrated in several preferred embodiments, it is, of course, not to be limited to the circuits shown since many variations thereof will be evident to one skilled in the art and are intended to be encompassed in the present invention as set forth in the following claims.

What is claimed is:

1. Linearized force measuring apparatus, comprising, in combination, a differential capacitor having a first plate, a second plate mounted parallel to said first plate in a reference position at a predetermined distance from said first plate and adapted to move in the direction perpendicular to said first plate under action of the force being measured, a third plate mounted in a fixed position parallel to said second plate at said predetermined distance therefrom on the side away from said first plate; displacement measuring means connected to said capacitor for furnishing a displacement signal having an amplitude varying as a function of displacement of said second plate from said reference position; analog/pulse converter means connected to said displacement measuring means and having a first and second converter output, for furnishing a sequence of positive pulses and a sequence of negative pulses at said first and second converter outputs respectively, the difference between the number of said positive and the number of said negative pulses per unit time varying as a function of said amplitude of said displacement signal, the total number of pulses per unit time remaining constant; and connecting means for connecting said converter output to said capacitor in such a manner that the electric force on said second plate created by said pulses opposes said force being measured, whereby the difference between the number of said positive and the number of said negative pulses per unit time constitutes a measure of the amplitude of said force being measured.

2. Force measuring apparatus as set forth in claim 1, wherein said analog/pulse converter means comprises comparator means connected to said displacement measurement means, for comparing said displacement signal to a reference signal and furnishing a positive and negative comparator output signal when said displacement signal is, respectively, greater than or less than said reference signal; timing signal furnishing means for furnishing timing signals at predetermined time intervals; and pulse furnishing means connected to said timing signal furnishing means and said comparator means, for furnishing a positive pulse at said first converter output in response to the simultaneous presence of a timing signal and said positive comparator output signal and for furnishing a negative pulse at said second converter output in response to the simultaneous presence of a timing signal and said negative comparator output signal, whereby the number of pulses per unit time corresponds to the number of said timing signals per unit time while the polarity of said pulses corresponds to the polarity of said comparator output signal.

3. Apparatus as set forth in claim 2, wherein said pulse furnishing means comprise control bistable circuit means adapted to change from a first to a second stable state in response to the simultaneous presence of said negative comparator output signal and one of said timing signals and from said second to said first stable state in response to the simultaneous presence of one of said timing signals and said positive comparator output signal, fur furnishing a first and second polarity control signal when in said first and second state respectively; and first and second bistable circuit means connected to said control bistable circuit means for furnishing said positive and negative pulses under control of said timing signals in response to said first and second polarity control signals respectively.

4. Apparatus as set forth in claim 3, wherein said second bistable circuit means comprise a first constant voltage source for furnishing a positive d.c. voltage, a first bistable multivibrator having a set state for connecting said positive d.c. voltage to said first converter output, a reset state for connecting ground potential to said first converter output, and adapted to change from said reset to said set state under control of said timing signal only in the presence of said first polarity control signal; and wherein said second bistable circuit means comprise a second constant voltage source for furnishing a negative d.c. voltage, a second bistable multivibrator interconnected between said second constant voltage source and said second converter output, for applying said negative d.c. voltage to said second converter output when in a set state and for applying zero potential to said second converter output when in the reset state, said second multivibrator switching from said reset to said set state under control of said timing signal only in the presence of said second polarity control signal.

5. Apparatus as set forth in claim 2, wherein said force to be measured acts in a first direction or in a second direction opposite to said first direction; wherein said comparator means comprise a first comparator and a second comparator for comparing said displacement signal to a determined positive and negative voltage respectively, and furnishing said first and second polarity control signal only when said displacement signal is more positive than said determined positive voltage and more negative than said determined negative voltage, respectively; and wherein said pulse furnishing means comprise a first and second flip-flop each having a set and reset input, a set and reset output, and a clock input connected to receive said timing signals, means for connecting the respective set outputs to the corresponding reset inputs and the respective reset outputs to the corresponding set inputs, and means for connecting said set input of said first flip-flop to the output of said first comparator and said set input of said second flip-flop to the output of said second comparator, a first constant voltage source furnishing a positive d.c. voltage, a second constant voltage source furnishing a negative d.c. voltage, a first bistable multivibrator adapted to trigger on positive-going pulse edges, having a set input connected to said set output of said first flip-flop and a reset input connected to said reset output of said first flip-flop, and interconnected between said first constant voltage source and said first converter output in such a manner that said positive voltage is applied to said first converter output when said first bistable multivibrator is set, second bistable circuit means, adapted to trigger on negative-going pulse edges, having a set input connected to said reset output of said second flip-flop and a reset input connected to said set output of said first flip-flop, and inter-connected between said second constant voltage source and said second converter output in such a manner that said negative voltage is applied to said second converter output when said second bistable multivibrator is set.

6. Force measuring apparatus comprising, in combination, a capacitor having a first plate and a second plate mounted parallel to said first plate in a reference position at a predetermined distance from said first plate and adapted to move in the direction perpendicular to said first plate under action of the force being measured; displacement measuring means connected to said capacitor for furnishing a displacement signal having an amplitude varying as a function of displacement of said second plate from said reference position; analog/pulses converter means connected to said displacement measuring means and having a converter output, for furnishing a sequence of pulses at said converter output, the number of pulses per unit time in said sequence of pulses varying as a function of said amplitude of said displacement signal, while the amplitude and width of said pulses remain substantially constant; and connecting means for connecting said converter output to said capacitor in such a manner that the electric force on said second plate created by said pulses opposes said force being measured, whereby the number of pulses per unit time in said sequence of pulses at said converter output constitutes a measure of the amplitude of said force being measured.

7. Apparatus as set forth in claim 6, further comprising amplifier means having a predetermined amplification factor connected to the output of said displacement measuring means; and switch means connected between the output of said amplifier means and said capacitor for connecting said output of said amplifier means to said capacitor in synchronism with the application of said pulses to said capacitor.

8. Apparatus as set forth in claim 5, further comprising auxiliary amplifier means having a predetermined amplification factor and having an input connected to the output of said displacement measurement means; wherein said third plate of said capacitor comprises a first and second planar conducting surface respectively opposite said first and second plates, and insulator means between said first and second conducting planar surfaces; further comprising first and second switch means for connecting the output of said auxiliary amplifier means to said first and second conducting planar surfaces respectively under control of said timing pulses, in such a manner that said first switch means operates in synchronism with the pulses in said sequence of positive pulses and said second switch means operates in synchronism with the pulses in said sequence of negative pulses.

9. Force measuring apparatus comprising, in combination, a capacitor having a first plate and a second plate mounted parallel to said first plate in a reference position at a predetermined distance from said first plate and adapted to move in the direction perpendicular to said first plate under action of the force being measured; displacement measuring means connected to said capacitor for furnishing a displacement signal having an amplitude varying as a function of displacement of said second plate from said reference position; analog/pulse converter means connected to said displacement measuring means and having a converter output, for furnishing a sequence of pulses at said converter output, the number of pulses per unit time in said sequence of pulses varying as a function of said amplitude of said displacement signal; connecting means for connecting said converter output to said capacitor in such a manner that the electric force on said second plate created by said pulses opposes said force being measured; amplifier means having a predetermined amplification factor proportional to the amplitude of said pulses divided by said predetermined distance between said first and second plates connected to the output of said displacement measuring means; and switch means connected between the output of said amplifier means and said capacitor for connecting said output of said amplifier means to said capacitor in synchronism with the application of said pulses to said capacitor.

* * * * *